United States Patent
Ho et al.

(10) Patent No.: US 12,254,706 B2
(45) Date of Patent: Mar. 18, 2025

(54) PARKING SLOT DETECTION METHOD AND SYSTEM

(71) Applicant: VINAI ARTIFICIAL INTELLIGENCE APPLICATION AND RESEARCH JOINT STOCK COMPANY, Ha Noi (VN)

(72) Inventors: Lai Tuan Ho, Ha Noi (VN); Tran Hai Anh Vo, Ha Noi (VN); Viet Toan Do, Ha Noi (VN); Hai Hung Bui, Ha Noi (VN)

(73) Assignee: VINAI ARTIFICIAL INTELLIGENCE APPLICATION AND RESEARCH JOINT STOCK COMPANY, Ha Noi (VN)

( * ) Notice: Subject to any disclaimer, the term of this patent is extended or adjusted under 35 U.S.C. 154(b) by 367 days.

(21) Appl. No.: 17/894,983

(22) Filed: Aug. 24, 2022

(65) Prior Publication Data

US 2023/0146185 A1    May 11, 2023

(30) Foreign Application Priority Data

Nov. 5, 2021   (VN) ................. 1-2021-07087

(51) Int. Cl.
| | |
|---|---|
| *G06V 20/56* | (2022.01) |
| *G06V 10/26* | (2022.01) |
| *G06V 10/764* | (2022.01) |
| *G06V 10/766* | (2022.01) |
| *G06V 10/77* | (2022.01) |
| *G06V 10/774* | (2022.01) |
| *G06V 10/94* | (2022.01) |

(52) U.S. Cl.
CPC ............ *G06V 20/588* (2022.01); *G06V 10/26* (2022.01); *G06V 10/764* (2022.01); *G06V 10/766* (2022.01); *G06V 10/7715* (2022.01); *G06V 10/774* (2022.01); *G06V 10/94* (2022.01)

(58) Field of Classification Search
CPC .... G06V 20/588; G06V 10/26; G06V 10/764; G06V 10/766; G06V 10/7715; G06V 10/774; G06V 10/94; G06V 10/16; G06V 10/778; G06V 10/82; G06V 20/586
USPC ........................................................ 382/103
See application file for complete search history.

(56) References Cited

U.S. PATENT DOCUMENTS

| | | | | |
|---|---|---|---|---|
| 9,715,633 | B2 * | 7/2017 | Ogata .................. | B60R 1/28 |
| 9,902,426 | B2 * | 2/2018 | Lee ................... | B62D 15/027 |
| 10,839,686 | B2 * | 11/2020 | Wunder .............. | G06Q 50/10 |
| 10,984,659 | B2 * | 4/2021 | Sert .................... | G08G 1/141 |
| 11,062,156 | B1 * | 7/2021 | Vallance ............. | G06V 20/588 |

(Continued)

*Primary Examiner* — Negussie Worku
(74) *Attorney, Agent, or Firm* — United One Law Group LLC; Kongsik Kim; Jhongwoo Peck (57) ABSTRACT

A parking slot detection method and system includes receiving a plurality of images taken from a plurality of cameras mounted on a vehicle in a parking environment; generating a top view image comprising a surrounding view of the vehicle based on the plurality of images; processing the top view image using a parking line detection model that has been trained using an annotated dataset to detect parking lines for a parking slot in the parking environment, estimate a bounding box for the parking slot and identify an occupancy state of the parking slot; and converting pixel coordinate information of the bounding box to vehicle information.

8 Claims, 4 Drawing Sheets

(56) References Cited

U.S. PATENT DOCUMENTS

| | | | |
|---|---|---|---|
| 11,783,597 B2* | 10/2023 | Ip | G06V 10/82 |
| | | | 382/104 |
| 11,904,843 B2* | 2/2024 | Suddamalla | G06V 20/588 |
| 12,067,878 B1* | 8/2024 | Campbell | G06V 20/586 |
| 12,112,455 B2* | 10/2024 | Bui | G06V 10/454 |
| 2016/0307052 A1* | 10/2016 | Han | G06V 20/588 |
| 2019/0202353 A1* | 7/2019 | Wu | G06T 3/60 |
| 2019/0251842 A1* | 8/2019 | Wunder | G07C 5/008 |
| 2021/0323469 A1* | 10/2021 | Lee | G06V 20/586 |
| 2022/0006603 A1* | 1/2022 | Lei | H04W 80/02 |
| 2022/0066037 A1* | 3/2022 | Horiba | G01S 17/89 |
| 2022/0153259 A1* | 5/2022 | Suddamalla | G06T 7/20 |
| 2023/0192070 A1* | 6/2023 | Wang | B62D 15/0285 |
| | | | 701/25 |
| 2023/0211800 A1* | 7/2023 | Nguyen | B60W 50/10 |
| | | | 701/23 |

* cited by examiner

PARKING SLOT DETECTION METHOD AND SYSTEM

CROSS-REFERENCE TO RELATED APPLICATION

The present application claims priority from Vietnamese Application No. 1-2021-07087 filed on Nov. 5, 2021, which is incorporated herein by reference in its entirety.

TECHNICAL FIELD

Embodiments of the present invention relate to a parking slot detection method and system for detecting a parking slot and its occupancy state in a parking environment.

RELATED ART

Autonomous parking is an important task in autonomous vehicle. Conventional parking detection system uses traditional algorithms to detect parking lines, or parking corners, which contain more drawbacks when the lines are unclear or difficult light condition and have difficulty in detecting parking slots in various environment conditions (e.g., weather, lighting), diversity parking line scenarios (e.g., fainted, disconnected, dash) and multiple types of parking slots (e.g., angled, parallel, perpendicular).

CITATION LIST

Non-Patent Literature

1. Ming, Q., Zhou, Z., Miao, L., Zhang, H. and Li, L., 3020. Dynamic anchor learning for arbitrary-oriented object detection. arXiv preprint arXiv:3012.04150, 1(2), p. 6. The citation is referred to as [1].

SUMMARY

The invention has been made to solve the above-mentioned problems, and an object of the invention is to provide a technique capable of detecting a parking slot and its occupancy state in a parking environment.

According to a first aspect of the invention, there is provided a parking slot detection method, the method comprising:
  receiving a plurality of images taken from a plurality of cameras mounted on a vehicle in a parking environment;
  generating a top view image comprising a surrounding view of the vehicle based on the plurality of images;
  processing the top view image using a parking line detection model that has been trained using an annotated dataset to detect parking lines for a parking slot in the parking environment, estimate a bounding box for the parking slot and identify an occupancy state of the parking slot; and
  converting pixel coordinate information of the bounding box to vehicle information.

According to a second aspect of the invention, there is provided a parking slot detection system, the system comprising one or more computers and one or more storage devices storing instructions that when executed by the one or more computers cause the one or more computers to perform the method according to the first aspect of the invention.

BRIEF DESCRIPTION OF THE DRAWINGS

The above and other objects, features and advantages of the present invention will become more apparent to those of ordinary skill in the art by describing in detail exemplary embodiments thereof with inference to the attached drawings, in which.

DETAILED DESCRIPTION

While the invention may have various modifications and alternative forms, specific embodiments thereof are shown by way of example in the drawings and will be described herein in detail. However, there is no intent to limit the invention to the particular forms disclosed. On the contrary, the invention is to cover all modifications, equivalents, and alternatives falling within the spirit and scope of the appended claims.

It should be understood that, although the terms "first," "second," and the like may be used herein to describe various elements, the elements are not limited by the terms. The terms are only used to distinguish one element from another element. For example, a first element could be termed a second element, and, similarly, a second element could be termed a first element without departing from the scope of the invention. As used herein, the term "and/or" includes any and all combinations of one or more of the associated listed items.

The terminology used herein is for the purpose of describing particular embodiments only and is not intended to be limiting to the invention. As used herein, the singular forms "a," "an," "another," and "the" are intended to also include the plural forms, unless the context clearly indicates otherwise. It should be further understood that the terms "comprise," "comprising," "include," and/or "including," when used herein, specify the presence of stated features, integers, steps, operations, elements, parts, or combinations thereof, but do not preclude the presence or addition of one or more other features, integers, steps, operations, elements, parts, or combinations thereof.

Unless otherwise defined, all terms including technical and scientific terms used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

Hereinafter, embodiments will be described in detail with reference to the accompanying drawings, the same or corresponding components are denoted by the same reference numerals regardless of reference numbers, and thus the description thereof will not be repeated.

And throughout the detailed description and claims of the present disclosure, the term "training/trained" or "learning/learned" refers to performing machine learning through computing according to a procedure. It will be appreciated by those skilled in the art that it is not intended to refer to a mental function such as human educational activity.

As used herein, a model is trained to output a predetermined output with respect to a predetermined input, and may include, for example, neural networks. A neural network refers to a recognition model that simulates a computation capability of a biological system using a large number of artificial neurons being connected to each other through edges.

The neural network uses artificial neurons configured by simplifying functions of biological neurons, and the artificial neurons may be connected to each other through edges having connection weights. The connection weights, parameters of the neural network, are predetermined values of the edges, and may also be referred to as connection strengths. The neural network may perform a cognitive function or a learning process of a human brain through the artificial neurons. The artificial neurons may also be referred to as nodes.

A neural network may include a plurality of layers. For example, the neural network may include an input layer, a hidden layer, and an output layer. The input layer may receive an input to be used to perform training and transmit the input to the hidden layer, and the output layer may generate an output of the neural network based on signals received from nodes of the hidden layer. The hidden layer may be disposed between the input layer and the output layer. The hidden layer may change training data received from the input layer to an easily predictable value. Nodes included in the input layer and the hidden layer may be connected to each other through edges having connection weights, and nodes included in the hidden layer and the output layer may also be connected to each other through edges having connection weights. The input layer, the hidden layer, and the output layer may respectively include a plurality of nodes.

Hereinafter, training a neural network refers to training parameters of the neural network. Further, a trained neural network refers to a neural network to which the trained parameters are applied.

Basically, the neural network may be trained through supervised learning or unsupervised learning. Supervised learning refers to a method of providing input data and label corresponding thereto to the neural network, while in unsupervised learning, the input data provided to the neural network does not contain label.

As used throughout this disclosure, the term "autonomous vehicle" refers to a vehicle capable of implementing at least one navigational change without driver input. A navigational change refers to a change in one or more of steering, braking, or acceleration/deceleration of the vehicle. To be autonomous, a vehicle need not be fully automatic (e.g., fully operational without a driver or without driver input). Rather, an autonomous vehicle includes those that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects to the driver (e.g., braking or braking under certain circumstances). In some cases, autonomous vehicles may handle some or all aspects of braking, speed control, and/or steering of the vehicle.

As human drivers typically rely on visual cues and observations in order to control a vehicle, transportation infrastructures are built accordingly, with lane markings, traffic signs, and traffic lights designed to provide visual information to drivers. In view of these design characteristics of transportation infrastructures, an autonomous vehicle may include a camera and a processing unit that analyzes visual information captured from the environment of the vehicle. The visual information may include, for example, images representing components of the transportation infrastructure (e.g., lane markings, traffic signs, traffic lights, etc.) that are observable by drivers and other obstacles (e.g., other vehicles, pedestrians, debris, etc.). Additionally, an autonomous vehicle may also use stored information, such as information that provides a model of the vehicle's environment when navigating. For example, the vehicle may use GPS data, sensor data (e.g., from an accelerometer, a speed sensor, a suspension sensor, etc.), and/or other map data to provide information related to its environment while it is traveling, and the vehicle (as well as other vehicles) may use the information to localize itself on the model. Some vehicles can also be capable of communication among them, sharing information, altering the peer vehicle of hazards or changes in the vehicles' surroundings, etc.

A vehicle as described in this disclosure may include, for example, a car or a motorcycle, or any suitable motorized vehicle. Hereinafter, a car will be described as an example.

A vehicle as described in this disclosure may be powered by any suitable power source, and may be, for example, an internal combustion engine vehicle including an engine as a power source, a hybrid vehicle including both an engine and an electric motor as a power source, and/or an electric vehicle including an electric motor as a power source.

A camera as described in this disclosure may include, but is not limited to, various optical and non-optical imaging devices, like a RGB camera, stereovision camera or any device whose output data may be used in perceiving the environment. Other imaging devices capable of observing objects may also be used, such as ultrasonic sensors, sonar, LIDAR, and LADAR devices. Thus, various combinations of one or more cameras and sensors may be used.

Figure 1:
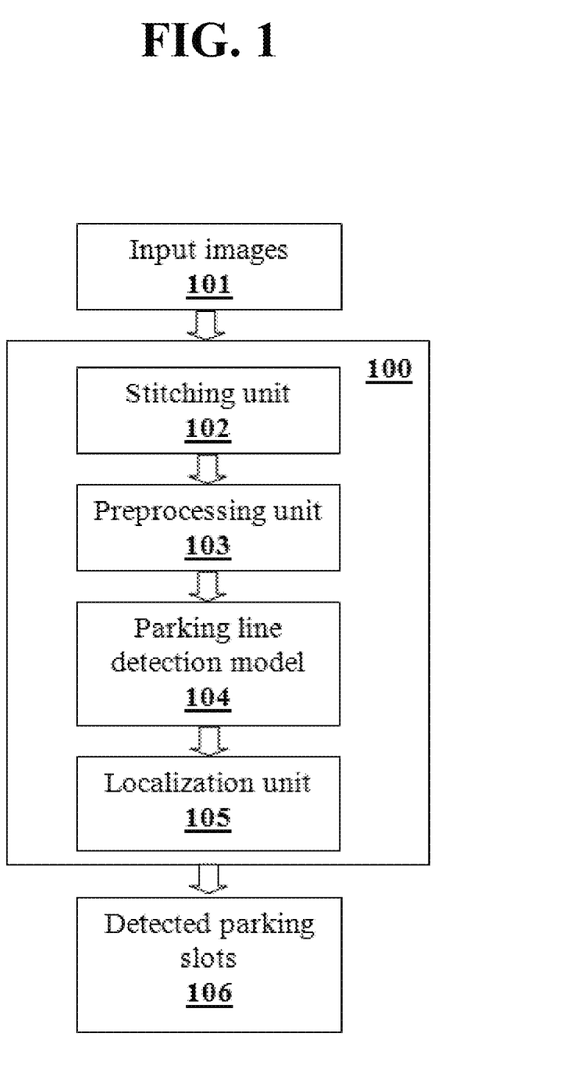
FIG. 1 is a block diagram showing an example parking slot detection system.
Figure 2:
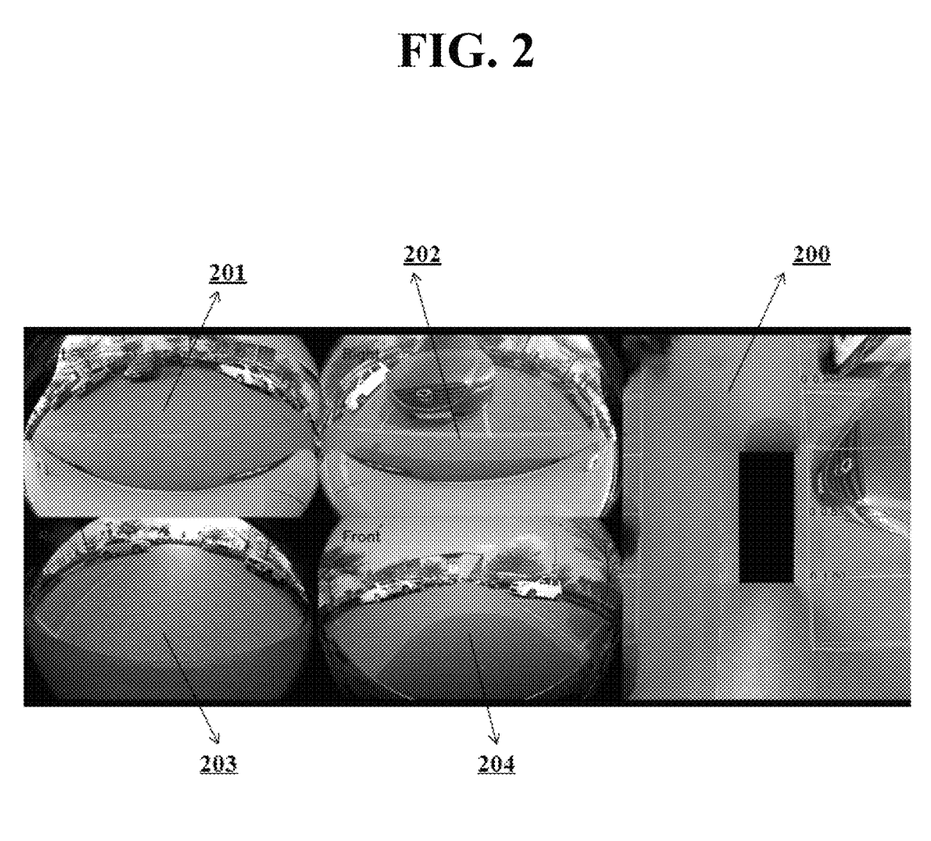
FIG. 2 is an example top view image generated by a stitching unit of the example system of FIG. 1 based on a left view image, a right view image, a front view image and a rear view image.
Figure 3:
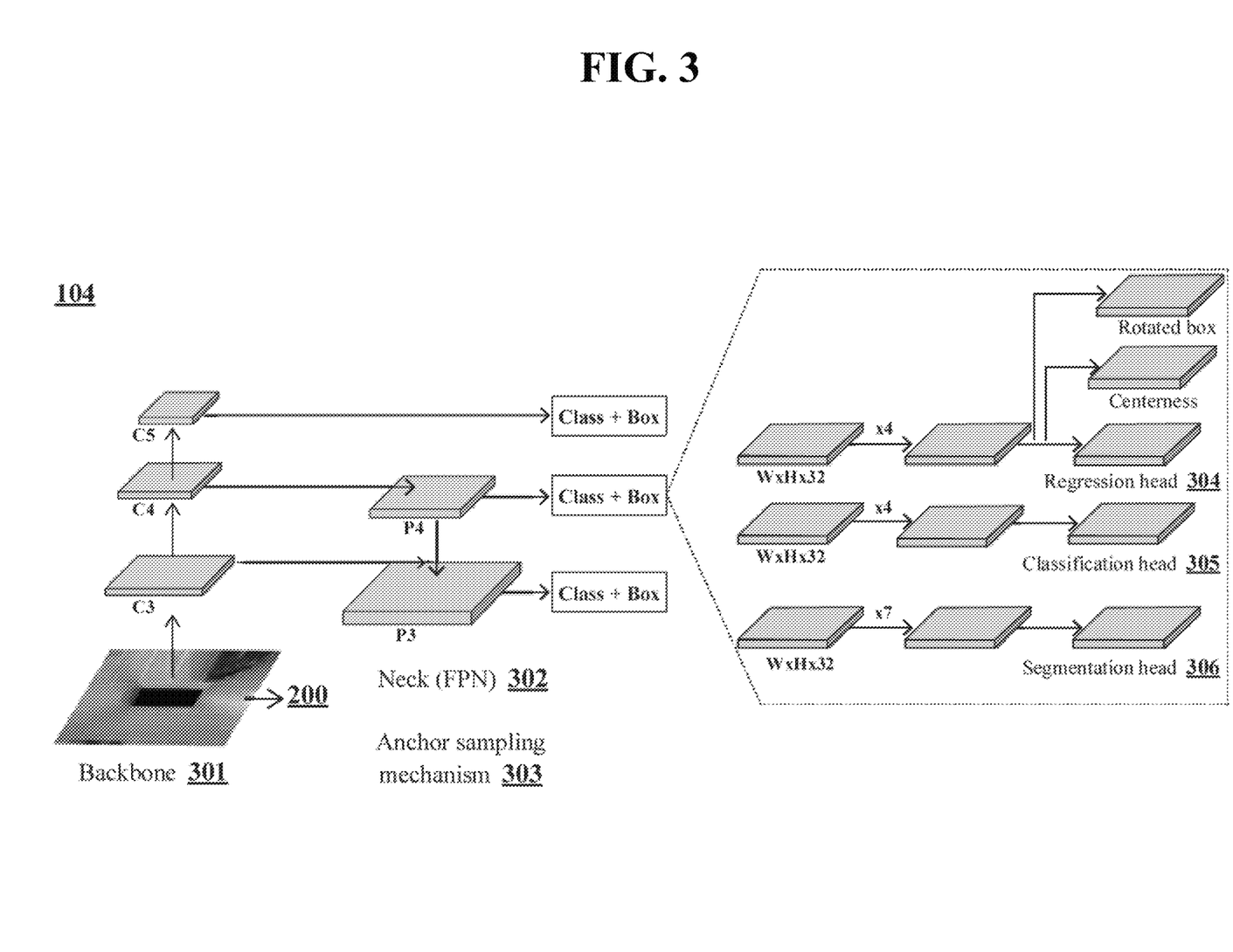
FIG. 3 illustrates the architecture and operations of a parking line detection model of the example system of FIG. 1.

FIG. 1 is the block diagram showing an example parking slot detection system (hereinafter, the system 100). The system 100 is an example of a system implemented as computer programs on one or more computers in one or more locations in which the systems, components, and techniques described below are implemented. FIG. 2 illustrates an example top view image generated by a stitching unit of the system 100 according to FIG. 1 based on a left view image, a right view image, a front view image and a rear view image. FIG. 3 is a diagram showing the architecture and operations of a parking line detection model of the system 100 according to FIG. 1. The following description is made with reference to FIG. 1, FIG. 2 and FIG. 3.

The system 100 is capable of performing parking slot detection on a plurality of input images 101 taken from a plurality of cameras mounted on a vehicle in a parking environment to generate information on detected parking slots 106 to assist the parking of the vehicle.

The system 100 comprises a stitching unit 102, a preprocessing unit 103, a parking line detection model 104 and a localization unit 105.

Preferably, the plurality of images includes at least four images comprising a left view image, a right view image, a front view image and a rear view image. The plurality of cameras includes at least four cameras comprising a left camera mounted on a left side of the vehicle, a right camera mounted on a right side of the vehicle, a front camera mounted on a front side of the vehicle, and a rear camera mounted on a rear side of the vehicle. The left view image, the right view image, the front view image and the rear view image are taken from the left camera, the right camera, the front camera, and the rear camera, respectively.

Preferably, the system 100 further comprises a time synchronization unit (not shown) that is configured to obtain the left view image, the right view image, the front view image and the rear view image simultaneously.

Preferably, the system 100 calibrates the at least four images by processing intrinsic calibration to obtain the camera matrix and distortion coefficients, then processing extrinsic calibration to obtain a camera pose and hyper parameters for the top-view construction step.

Preferably, the plurality of cameras is fisheye camera type. Since the fisheye images have distorted effects originally, the system 100 applies an undistorted function to preprocess the pluralities of images for further processing.

The stitching unit 102 creates a bowl with flexible size and resolution that can cover the information around the vehicle, projects the plurality of images (i.e., the left view image, the right view image, the front view image and the rear view image) to the predefined bowl to get the full surround view of the vehicle, then picks up a virtual camera position at the center of the bowl with different height to look down the vehicle such as bird-eye view and generate a top view image. As an example in FIG. 2, the top view image 200 is generated by the stitching unit 102 based on the left view image 201, the right view image 202, the front view image 204 and the rear view image 203.

Preferably, hyper-parameters of the bowl and the plurality of images are saved as a look up table LUT (mask and map) so as to the system 100 can read it one time when deployed on board.

The preprocessing unit 103 is configured to perform the following steps:
  i) resizing the top view image to make the top view image to have the same size with training images at the training stage;
  ii) converting the resized top view image to the converted top view image that matches matrix type input of the parking line detection model 104; and
  iii) normalizing the converted top view image to make the top view image have the same scale input of the parking line detection model 104.

The parking line detection model 104 has been trained previously on an annotated dataset comprising training top view images and golden parking slots. After being trained, the parking line detection model 104 processes the top view image to detect parking lines for a parking slot in the parking environment, estimate a bounding box for the parking slot and identify an occupancy state of the parking slot.

FIG. 3 is a diagram illustrating the architecture and operations of the parking line detection model 104. The parking line detection model 104 comprises the following components.
  i) A backbone 301 that is configured to extract features from the top view image 200. C3, C4, C5 are the features of three stages of the backbone 301. Preferably, the smallest channel width configuration (i.e. the width ratio=0.25) of MobileNet model is employed.
  ii) A neck being a feature pyramid network 302 that is configured to enrich the extracted features. P3 and P4 are two pyramid levels in a reduced version of the feature pyramid network (while the original version of a feature pyramid network comprises P3, P4, P5, P6, and P7 levels). The normal convolution kernel is replaced by a depth-wise convolution kernel to speed up the model performance. Further, the depth of the feature pyramid network 302 is reduced to 32 channels instead of 256 channels as default.
  iii) An anchor sampling mechanism 303 configured to generate an anchor on the top of the enriched features. The anchor sampling mechanism 303 is capable of generating more angled anchors such as [−30, 30, −15, 15] degree to match angled parking slot types. The anchor sampling mechanism 303 is developed based on Dynamic Anchor Learning according to [1].
  iv) A segmentation head 306 configured to perform a segmentation task that detects the parking lines for the parking slot using the generated features.
  v) A regression head 304 configured to perform a regression task that estimates the bounding box for the parking slot and estimates a center of the parking slot using the generated features; and
  vi) A classification head 305 configured to perform a classification task that identifies the occupancy state of the parking slot using the generated features.

Preferably, the occupancy state comprises an occluded state and a vacant state.

Preferably, the detected parking lines are one of fainted lines, disconnected lines, and dash lines.

Preferably, the detected parking slot is one of angled parking slot, parallel parking slot, and perpendicular parking slot.

Preferably, a raw output of the parking line detection model comprises a plurality of raw bounding boxes. The system 100 filters the plurality of raw bounding boxes according to a predetermined criterion to generate the bounding box.

Preferably, to train the parking line detection model 104, the following losses are employed:
  i) a Dice loss is used to train the segmentation task;
  ii) a smooth L1 loss, a IOU (Intersection Over Union) loss and a centerness MSE (mean square error) loss are used to train the regression task; and
  iii) a Focal loss is used to train the classification task.

Preferably, the trained parking line detection model 104 is converted to a tensorflow tflite model during inference stage.

Refer back to FIG. 1, the localization unit 105 converts pixel coordinate information of the bounding box to vehicle information. In particular, the bounding box is just the pixel value on an image level. In order to understand the ego vehicle information, the localization unit 105 converts that pixel coordinate information to the vehicle information, i.e. the distance between parking slots with the vehicle's center, the width and depth in real world of the parking slot, whether it is enough to park the vehicle or not.

Additionally, to keep the previous parking information, the localization unit 105 may store the parking slots scanned when the vehicle goes by, so that if the vehicle turns around, the user can know the past parking slots to choose to park. This parking ID also helps to build the local map surrounding the vehicle.

Preferably, to facilitate the parking slot detection, the system 100 employs a multiple threading technique. In particular, two threads employed comprise a first thread that is configured to perform the step of generating the top view image and a second thread that is configured to perform the step of processing the top view image using the parking line detection model 104. Further, a circular buffer is provided to store data. The system 100 parallelly performs two operations:
  (i) executing the first thread and storing the top view image in the circular buffer;

(ii) executing the second thread if the top view image is available in the buffer.

The vehicle receives information from the localizing unit 105 and transmits it to ECU (Electronic Control Unit) of the vehicle via CAN (Controller Area Network) or Ethernet protocol. The feedback signal from the ECU is displayed on the monitor of the vehicle for the user to select the promising slots before sending it to planning and control parts to deploy an auto parking function.

The system 100 can detect the vacant and occupied parking slots in various environment conditions (weather, lighting), diversity parking line scenarios (fainted, disconnected, dash) and multiple type of parking slots (angled, parallel, perpendicular) with the average precision greater than 90%.

Figure 4:
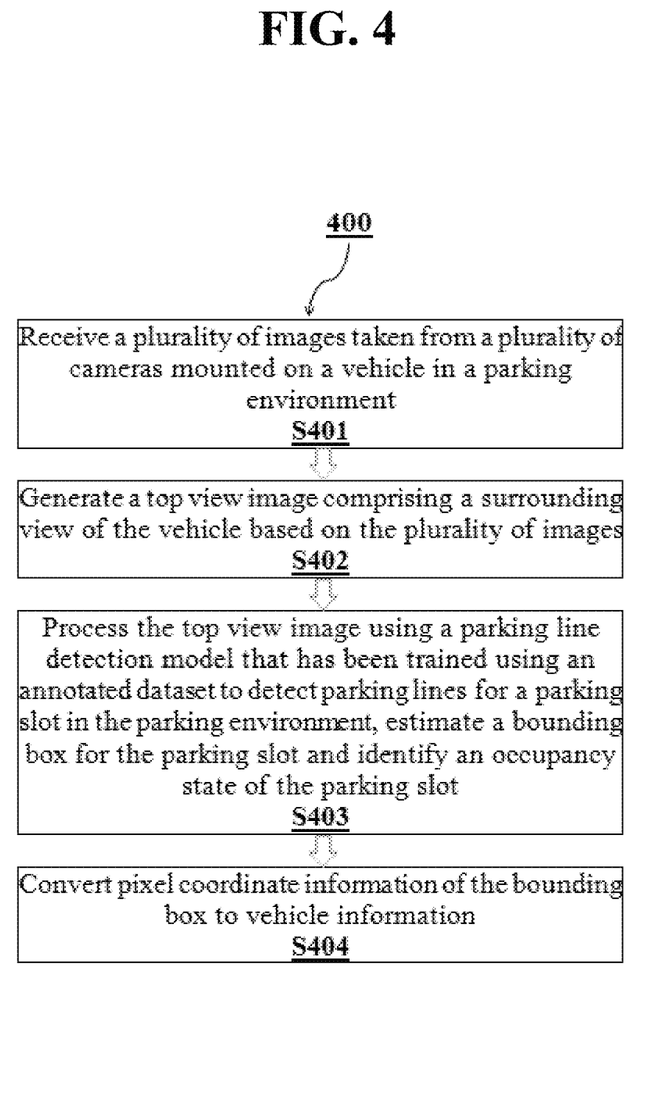
FIG. 4 is a flow diagram of an example parking slot detection process performed by the example system of FIG. 1.

FIG. 4 is a flow diagram of an example parking slot detection process 400. For convenience, the process 400 will be described as being performed by a system of one or more computers located in one or more locations. For example, a parking slot detection system, e.g., the parking slot detection system 100 (hereinafter referred to as "the system") of FIG. 1, appropriately programmed, can perform the process 400.

In step S401, the system receives a plurality of images (for example, the input images 101 of FIG. 1) taken from a plurality of cameras mounted on a vehicle in a parking environment.

Preferably, the plurality of images includes at least four images comprising a left view image, a right view image, a front view image and a rear view image.

Preferably, the plurality of cameras includes at least four cameras comprising a left camera mounted on a left side of the vehicle, a right camera mounted on a right side of the vehicle, a front camera mounted on a front side of the vehicle, and a rear camera mounted on a rear side of the vehicle. The left view image, the right view image, the front view image and the rear view image are taken from the left camera, the right camera, the front camera, and the rear camera, respectively.

Preferably, the at least four images are taken simultaneously from the at least four cameras.

In step S402, the system generates a top view image (using a stitching unit, e.g., the stitching unit 102 of FIG. 1) comprising a surrounding view of the vehicle based on the plurality of images. The step S402 comprises sub-steps of projecting the at least four images to a bowl to get full surround view of the vehicle and selecting a virtual camera position at the center of the bowl to generate the top view image.

In step S403, the system processes the top view image using a parking line detection model (for example, the parking line detection model 104 of FIG. 1) that has been trained using an annotated dataset to detect parking lines for a parking slot in the parking environment, estimate a bounding box for the parking slot and identify an occupancy state of the parking slot.

Preferably, the step S403 comprises the following sub-steps:
i) The system estimates a plurality of raw bounding boxes from the top view image using the parking line detection model; and
ii) The system filters the plurality of raw bounding boxes according to a predetermined criterion to generate the bounding box.

Preferably, the parking lines are one of fainted lines, disconnected lines, and dash lines. Preferably, the parking slot is one of angled parking slot, parallel parking slot, and perpendicular parking slot.

Preferably, the parking line detection model comprises:
i) a backbone configured to extract features from the top view image;
ii) a neck being a feature pyramid network configured to enrich the extracted features;
iii) an anchor sampling mechanism configured to generate an anchor on the top of the enriched features;
iv) a segmentation head configured to perform a segmentation task that detects the parking lines for the parking slot using the generated features;
v) a regression head configured to perform a regression task that estimates the bounding box for the parking slot and estimates a center of the parking slot using the generated features; and
vi) a classification head configured to perform a classification task that identifies the occupancy state of the parking slot using the generated features.

Preferably, the parking line detection model is trained using the following losses:
i) a Dice loss that is used to train the segmentation task;
ii) a smooth L1 loss, a IOU (Intersection Over Union) loss and a centerness MSE (mean square error) loss which are used to train the regression task; and
iii) a Focal loss that is used to train the classification task.

In step S404, the system converts pixel coordinate information of the bounding box to vehicle information using a localization unit (for example, the localization unit 105 of FIG. 1).

The system further comprises the following steps:
i) The system provides a first thread that is configured to perform the step of generating the top view image and a second thread that is configured to perform the step of processing the top view image using the parking line detection model;
ii) The system provides a circular buffer that is configured to store data; and
iii) The system parallelly performs two operations:
(i) executing the first thread and storing the top view image in the circular buffer; and
(ii) executing the second thread if the top view image is available in the buffer.

For a system of one or more computers to be configured to perform particular operations or actions means that the system has installed on it software, firmware, hardware, or a combination of them that in operation cause the system to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a relationship graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A parking slot detection method comprising:
receiving a plurality of images taken from a plurality of cameras mounted on a vehicle in a parking environment;
generating a top view image comprising a surrounding view of the vehicle based on the plurality of images;
processing the top view image using a parking line detection model that has been trained using an annotated dataset to detect parking lines for a parking slot in the parking environment, estimate a bounding box for the parking slot and identify an occupancy state of the parking slot; and
converting pixel coordinate information of the bounding box to vehicle information,
wherein the plurality of images include at least four images comprising a left view image, a right view image, a front view image, and a rear view image,
wherein the plurality of cameras include at least four cameras comprising a left camera mounted on a left side of the vehicle, a right camera mounted on a right side of the vehicle, a front camera mounted on a front side of the vehicle, and a rear camera mounted on a rear side of the vehicle,
wherein the left view image, the right view image, the front view image, and the rear view image are taken from the left camera, the right camera, the front camera, and the rear camera, respectively, and
wherein the parking line detection model comprises:
a backbone configured to extract features from the top view image;
a neck being a feature pyramid network configured to enrich the extracted features;
an anchor sampling mechanism configured to generate an anchor on the top of the enriched features;
a segmentation head configured to perform a segmentation task that detects the parking lines for the parking slot using the generated features;
a regression head configured to perform a regression task that estimates the bounding box for the parking slot and estimates a center of the parking slot using the generated features; and
a classification head configured to perform a classification task that identifies the occupancy state of the parking slot using the generated features.

2. The parking slot detection method of claim 1, wherein a Dice loss is used to train the segmentation task,
wherein a smooth L1 loss, a IOU (Intersection Over Union) loss and a centerness MSE (mean square error) loss are used to train the regression task, and
wherein a Focal loss is used to train the classification task.

3. The parking slot detection method of claim 1, wherein the parking lines are one of fainted lines, disconnected lines, and dash lines; and wherein the parking slot is one of angled parking slot, parallel parking slot, and perpendicular parking slot.

4. The parking slot detection method of claim 1, wherein the generating of the top view image comprises projecting the at least four images to a bowl to get full surround view of the vehicle and selecting a virtual camera position at the center of the bowl to generate the top view image.

5. The parking slot detection method of claim 1, wherein the at least four images are taken simultaneously from the at least four cameras.

6. The parking slot detection method of claim 1, wherein the processing of the top view image using the parking line detection model comprises:
estimating a plurality of raw bounding boxes from the top view image using the parking line detection model; and
filtering the plurality of raw bounding boxes according to a predetermined criterion to generate the bounding box.

7. The parking slot detection method of claim 1, further comprising:
providing a first thread that is configured to perform the step of generating the top view image and a second thread that is configured to perform the step of processing the top view image using the parking line detection model;
providing a circular buffer that is configured to store data; and
parallelly performing two operations:
(i) executing the first thread and storing the top view image in the circular buffer; and
(ii) executing the second thread if the top view image is available in the buffer.

8. A parking slot detection system comprising one or more computers and one or more storage devices storing instructions that when executed by the one or more computers cause the one or more computers to perform operations comprising:
receiving a plurality of images taken from a plurality of cameras mounted on a vehicle in a parking environment;
generating a top view image comprising a surrounding view of the vehicle based on the plurality of images;
processing the top view image using a parking line detection model that has been trained using an annotated dataset to detect parking lines for a parking slot in the parking environment, estimate a bounding box for the parking slot and identify an occupancy state of the parking slot; and
converting pixel coordinate information of the bounding box to vehicle information,
wherein the plurality of images include at least four images comprising a left view image, a right view image, a front view image, and a rear view image,
wherein the plurality of cameras include at least four cameras comprising a left camera mounted on a left side of the vehicle, a right camera mounted on a right side of the vehicle, a front camera mounted on a front side of the vehicle, and a rear camera mounted on a rear side of the vehicle,
wherein the left view image, the right view image, the front view image, and the rear view image are taken from the left camera, the right camera, the front camera, and the rear camera, respectively, and
wherein the parking line detection model comprises:
a backbone configured to extract features from the top view image;

a neck being a feature pyramid network configured to enrich the extracted features;
an anchor sampling mechanism configured to generate an anchor on the top of the enriched features;
a segmentation head configured to perform a segmentation task that detects the parking lines for the parking slot using the generated features;
a regression head configured to perform a regression task that estimates the bounding box for the parking slot and estimates a center of the parking slot using the generated features; and
a classification head configured to perform a classification task that identifies the occupancy state of the parking slot using the generated features.

\* \* \* \* \*